United States Patent [19]

Griffin et al.

[11] Patent Number: 4,993,577
[45] Date of Patent: Feb. 19, 1991

[54] CONTAINERS

[75] Inventors: Christopher J. Griffin, Ealing; David W. Helps, London; Gerard M. O'Brien, South Oxhey, England

[73] Assignee: General Foods Limited, Banbury, England

[21] Appl. No.: 426,369

[22] Filed: Oct. 24, 1989

[30] Foreign Application Priority Data

Nov. 24, 1988 [GB] United Kingdom ................ 8827502

[51] Int. Cl.⁵ ............................................. B65D 51/22
[52] U.S. Cl. .......................... 220/258; 220/DIG. 25; 206/519
[58] Field of Search ........ 220/256, 258, 359, DIG. 25

[56] References Cited

U.S. PATENT DOCUMENTS

| | | | |
|---|---|---|---|
| 3,419,181 | 12/1968 | Stec | 220/258 |
| 3,537,610 | 11/1970 | Bilon | 220/258 |
| 4,094,460 | 6/1978 | Scanga et al. | 220/258 X |
| 4,466,553 | 8/1984 | Zenger | 220/258 X |
| 4,856,674 | 8/1989 | Berney | 220/258 |

Primary Examiner—Stephen Marcus
Assistant Examiner—Nova Stucker
Attorney, Agent, or Firm—Linn I. Grim

[57] ABSTRACT

The present invention discloses a microwave container comprising a receptacle having a foodstuff hermetically sealed therein by means of a metal lid and a collar which is of annular configuration and adapted to located over the rim of the receptacle when the hermetically sealed lid is removed therefrom, the collar being provided with a means whereby, in use, any edge of the metal lid remaining after removal is shielded from microwave radiation.

11 Claims, 2 Drawing Sheets

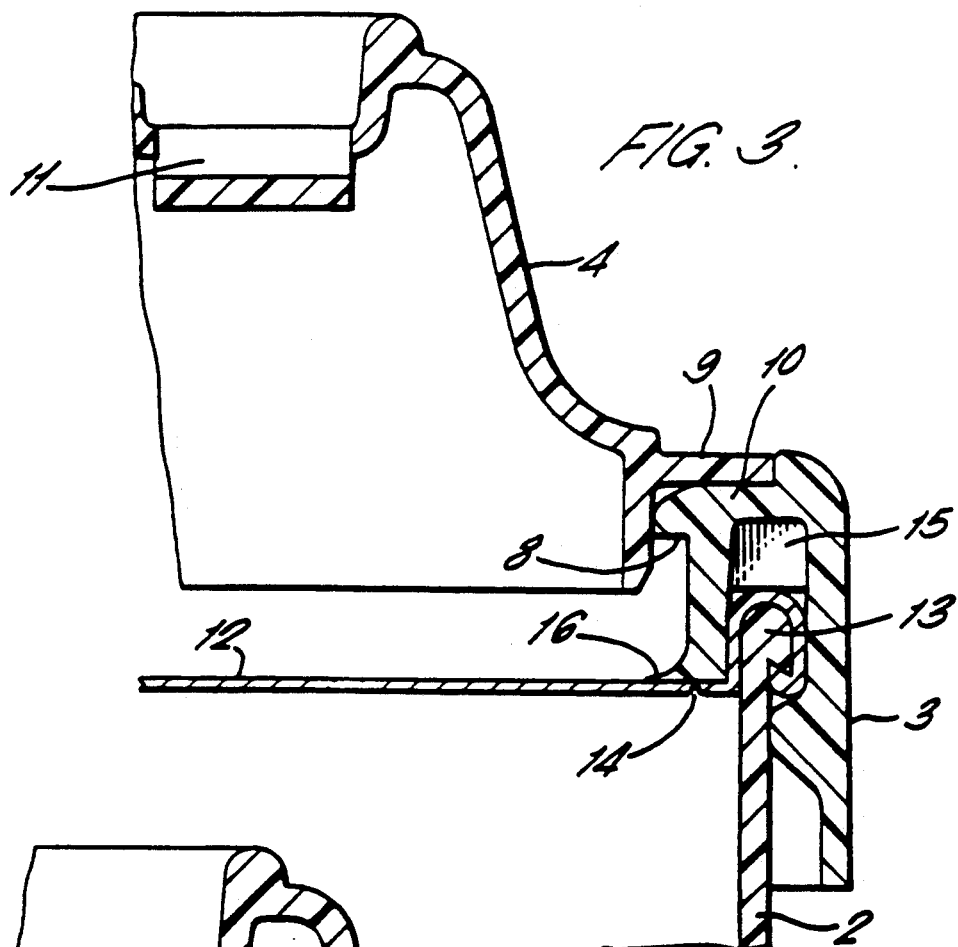
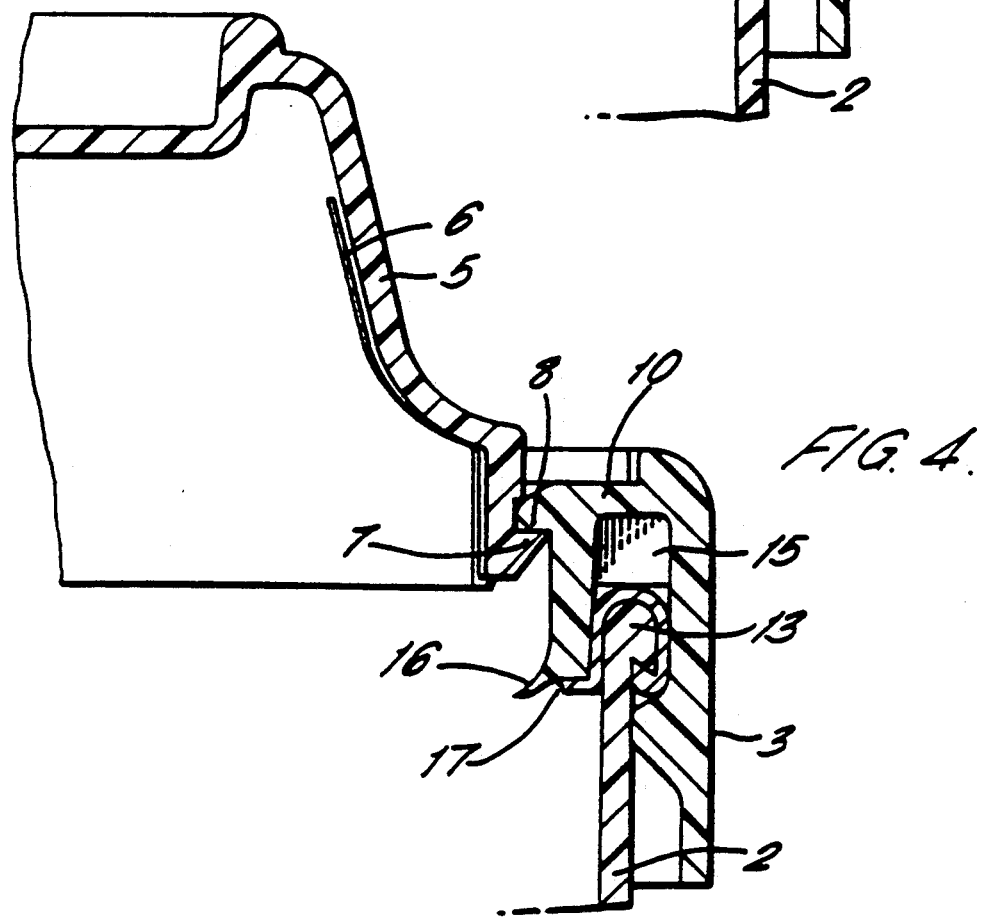

CONTAINERS

The present invention relates to containers which contain ready prepared meals and, in particular, to containers for ready prepared meals which are intended to be reheated in a microwave oven or for meals which are to be cooked in a microwave oven.

It is known that foodstuff can be hermetically sealed into a container intended for microwave use by means of a metal or foil lid using a process akin to that of a conventional canning process. Prior to heating or cooking the food in the microwave container the metal or foil lid is removed. However, the removal of the metal lid from the microwave container is not always complete and the incomplete removal thereof causes significant problems when the microwave container is placed in a microwave oven because of arcing from the metal edge remaining around the rim of the container. The incomplete removal of the metal lid can also be dangerous to the user with the risk of cutting the hands or fingers.

Furthermore, in transit the hermetically sealed container may be dropped, bumped or otherwise mishandled and in some instances the hermetic seal becomes damaged causing the contents of the container to spoil.

It has been proposed to snap fit a collar of essentially inverted U-shaped cross-section over the rim of a container of the above described type, but it has been found that such a collar does not satisfactorily cover the total edge of the metal left after the metal lid has been removed.

We have now developed a collar for use with microwave containers of the above type which overcomes these problems.

Accordingly, the present invention provides a microwave container comprising a receptacle having a foodstuff hermetically sealed therein by means of a metal lid and a collar which is of annular configuration and adapted to located over the rim of the receptacle when the hermetically sealed lid is removed therefrom, the collar being provided with a means whereby, in use, any edge of the metal lid remaining after removal is shielded from microwave radiation.

The collar of the container of the present invention is preferably of essentially an inverted U-shaped cross-section and the means to shield any edge of the metal lid remaining after removal from microwave radiation is preferably a flange extending from the bottom of the inner limb of the U-shaped collar towards the centre of the annulus. Preferably, the metal lid which is hermetically sealed onto the receptacle of the container is provided with a line of weakness adjacent the periphery thereof and beneath the flange of the collar. Accordingly, when the metal lid is removed from the receptacle it tears along the line of weakness and the remaining metal edge of the lid is thus covered by the flange formed on the collar.

The receptacle and the collar of the microwave container are preferably formed from a rigid or semirigid microwave compatible plastics material. Suitable plastics materials for the receptacle and/or the collar are polyester, high density polyethylene, polypropylene or a multilayer material. It will be understood that the receptacle and the collar may be made from the same or different plastics materials, accordingly to choice.

The collar may be adapted to locate over the rim of the receptacle by any suitable means. For example, the collar may be adapted to snap fit over the rim of the receptacle, or the collar and the receptacle may be provided with co-operating features in order to interlock them together. For example, the receptacle may be provided adjacent the rim thereof with a screw thread and a co-operating screw thread may be provided on the inside surface of the outer limb of a collar of U-shaped configuration.

The collar and the receptacle are preferably formed by injection moulding and in this manner suitable co-operating features may be moulded onto both the receptacle and the collar.

Preferably, the microwave container of the invention is also provided with a lid in order to prevent the foodstuff contained therein from splashing and spluttering during heating or cooking thereof. Whilst the lid may merely rest on top of the container it is preferred that the lid and collar are provided with co-operating features so that the lid can be secured to the collar. The lid may be located either on the inside or the outside of the collar, according to design. For example, the inside of the collar may be provided with a screw thread and a corresponding co-operating screw thread provided on the outer edge of the lid. Alternatively, the lid may snap fit onto the collar. The lid may be provided with gripping means in order to make it easier to put the lid onto and to remove the lid from the receptacle.

The lid will preferably be formed from a microwave compatible plastics material, such as those which are described above.

The lid is preferably provided with one or more venting means, so that when the container is placed in the microwave oven steam is able to escape therefrom during heating or cooking of the foodstuff. The lid is preferably also provided with means adapted, in use, to frictionally engage the side wall of the receptacle portion of another container stacked therein. This is of particular importance for the transport and display of the microwave containers of the invention prior to sale.

The microwave container of the invention has a shelf life which is much longer than the shelf life of ready prepared meals and foodstuffs intended for microwave heating which are not hermetically sealed into a container. A shelf life of at least six months can be achieved with the microwave containers of the invention and, once the hermetically sealed metal lid is removed from the top of the receptacle containing the foodstuff the container may then be heated in a microwave oven without problems of arcing from the edge of the metal lid being encountered.

The present invention will now be further described by way of specific example and with reference to the encompanying drawings in which;

FIG. 3 is a section through the upper portion of the container of FIG. 1 along line 3—3, and FIG. 4 is a part section through the container of FIG. 1 along line 4—4.

Figure 1:
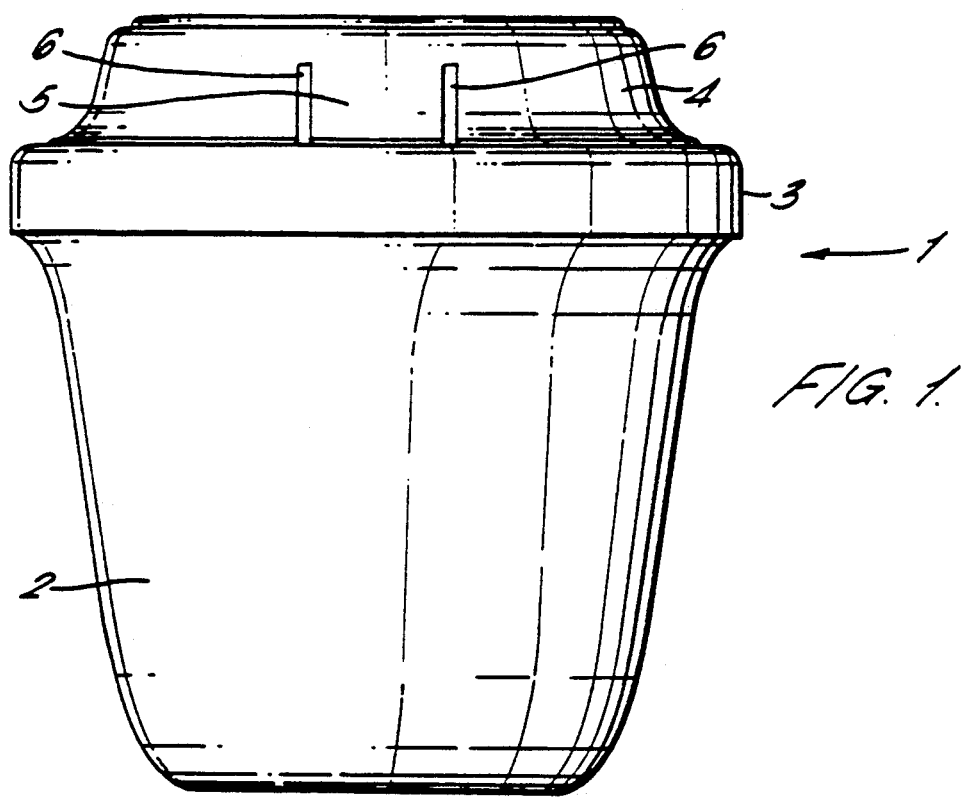
FIG. 1 is a perspective view of a container according to the invention.
Figure 2:
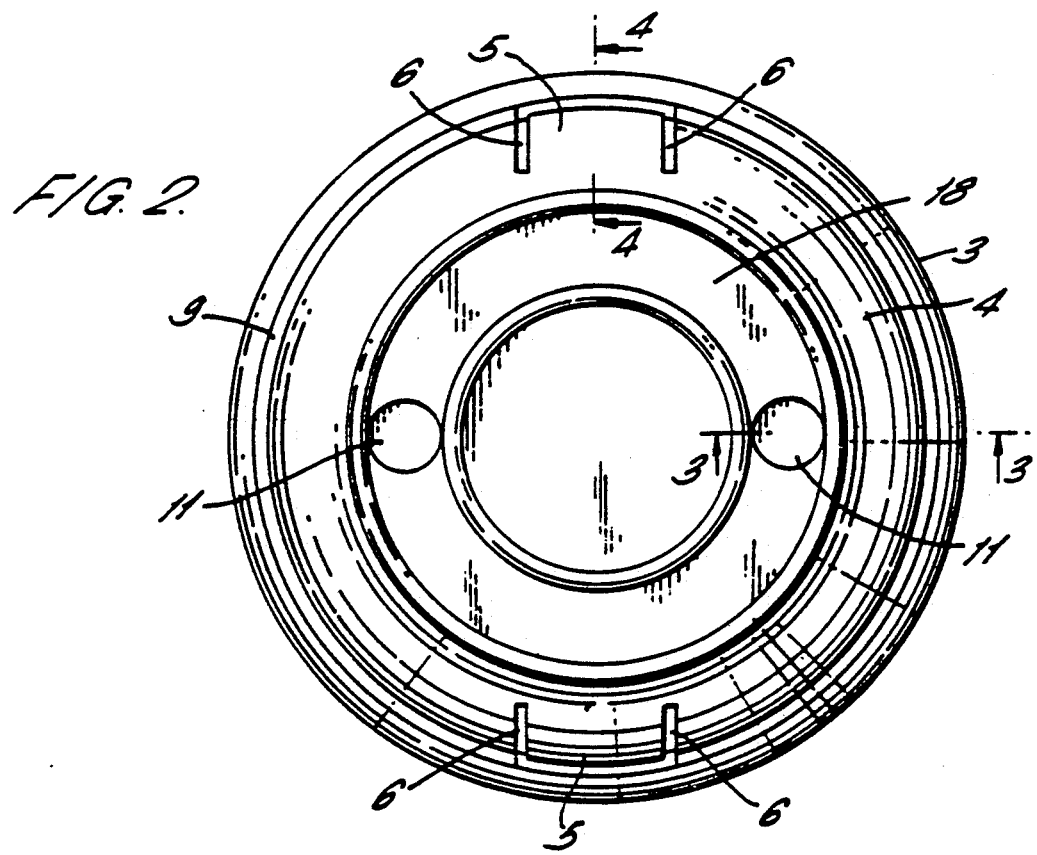
FIG. 2 is a plan view of the container of FIG. 1.

Referring to the figures of the accompanying drawings, a container according to the invention is generally shown at 1. The container comprises a receptacle 2 which contains a foodstuff, such as a ready prepared meal, a collar 3 and a lid 4. The receptacle, collar and lid are all made from a microwave compatible plastics material. The lid 4 is provided, as best shown in FIG. 2, with finger gripping portions 5 which provide finger holds for locating the lid on the collar and removing it therefrom. The finger gripping portions 5 are cut into the lid 4 and have slots 6 formed on either side thereof. The finger gripping portions 5 of the lid thus flex inwardly when pressure is applied thereto and this enables the lid 4 to be secured onto collar 3 by means of flanges 7 formed at the bottom of finger gripping portions 5 locating under shoulders 8 formed on the collar. The lid 4 can thus be located on and removed from the collar. The lid 4 is provided around the remainder of the periphery thereof with a projecting rim 9 which located upon co-operating shoulder 10 of the collar 3.

The lid 4 is also provided with venting holes 11 through which steam is able to escape on heating the contents of the container in a microwave oven.

The receptacle 2 has a metal lid 12 hermetically sealed across the top thereof, the metal lid, as shown in FIG. 3 being wrapped around the rim 13 of the receptacle 2. The metal lid 12 has a line of weakness 14 which extends around the metal lid 12 close to the periphery thereof. FIG. 3 illustrates the container of the invention before the metal lid 12 is removed therefrom, i.e. before it is intended for the container to be placed in a microwave oven. FIG. 4 illustrates the container when the metal lid 12 has been removed and when the contents are ready to be heated or cooked in a microwave oven.

The collar 3 snap fits over the rim 13 of the container. The collar is of an essentially inverted U-shaped configuration and is strengthened by ribs 15 spaced around the periphery thereof. The collar 3 is provided on the inner limb of the inverted U-shaped section with a flange 16 which in FIG. 3 projects horizontally towards the centre of the container. The flange 16 bears against the metal lid 12.

When the metal lid is removed from the receptacle it tears along the line of weakness 14 and, on tearing, the flange 16 of collar 3 springs downwardly to cover the remaining torn edge of the metal 17, the flange then projects downwardly and essentially towards the centre of the receptacle at an angle of about 50° to the vertical.

When the container of the present invention is purchased the consumer will, prior to use, remove the lid 4 therefrom by applying pressure to finger gripping portions 5 in order to unlock the flanges 7 from beneath shoulders 8 of the collar portion. After removal of the lid 4, the metal lid 12 hermeticallly sealed onto the rim of the receptacle 2 is removed. The lid tears along the line of weakness 14 and on removal of the lid !2 the flange 16 at the end of the inner limb of the inverted U-shaped collar 3 conforms to the shape in which the collar was moulded, thus projecting downwardly to cover the torn edge 17 of the metal lid 12. The lid 4 can then be replaced over the contents of the receptacle 2 by applying pressure to the finger gripping portions 5 in order that the flange 7 locate under shoulders 8 of the collar portion. The container is then ready to be placed in a microwave oven in order to heat and/or cook the contents of the receptacle.

The base of the receptacle 2 is preferably provided with a dished bottom so that it will locate in the dished portion 18 of the lid 4. This is preferred for the transport and storage of the containers of the invention.

In the embodiment of the invention as described above with reference to the drawings, the torn edge 17 of the metal lid 12 of the container is covered by the flange 16 of the collar, thus preventing arcing when the container is placed in a microwave oven and avoiding the torn edge being a hazard to the user. Furthermore, the line of weakness 14 of the lid 12 is covered by flange 16 of the collar, thus assisting in protecting the hermetic seal from rupture during transit.

We claim:

1. A microwave container comprising:
  (a) a foodstuff containing receptacle having a projecting rim;
  (b) a metal lid for said receptacle to hermetically seal said receptacle on said projecting rim; and
  (c) a collar having an annular configuration and adapted to locate over said rim of said receptacle when said hermetically sealed metal lid is removed therefrom, said collar being provided with a means whereby, in use, any edge of said metal lid remaining after removal is shielded from microwave radiation.

2. The container of claim 1 wherein the collar is of an essentially inverted U-shaped crossection having an inner limb and said collar is provided with a flange which extends from the bottom of said inner limb of said U-shaped crossection towards the center of the annulus.

3. The container of claim 2, wherein said receptacle and collar are formed from a rigid or semi-rigid microwave compatible plastics material.

4. The container of claim 3 wherein the plastics material for the receptacle and/or the collar is polyester, high density polyethylene, polypropylene or a multilayer material.

5. The container of claim 1 wherein said collar is adapted to snap fit over said rim of said receptacle.

6. The container of claim 2 wherein said collar is adapted to snap fit over said rim of said receptacle.

7. The container of claim 2, wherein said receptacle is provided adjacent said rim with a screw thread and the inner surface of said outer limb of said U-shaped collar is provided with a cooperating screw thread.

8. The container of claim 2 wherein said metal lid is provided with a line of weakness adjacent the periphery thereof and beneath said flange of said collar so that when said lid is removed from said receptacle, the remaining metal edge is covered by the flange of said collar.

9. The container of claim 1 wherein said lid and collar are provided with cooperating features so that said lid can be secured to said collar.

10. The container of claim 9 wherein said lid is provided with at least one venting means.

11. The container of claim 10 wherein said lid is provided with means adapted in use, to frictionally engage the side wall of the receptacle portion of another container stacked therein.

* * * * *